United States Patent [19]
Herriau

[11] 4,403,713
[45] Sep. 13, 1983

[54] DISTRIBUTING DEVICE FOR SO-CALLED SINGLE-SEED SEED DRILLS AND SEED DRILL COMPRISING SUCH A DEVICE

[75] Inventor: Paul Herriau, Cambrai, France
[73] Assignee: Societe SOGEFINA Societe de Gestion Financiere Armoricaine, Paris, France
[21] Appl. No.: 249,367
[22] Filed: Mar. 31, 1981
[30] Foreign Application Priority Data
Mar. 31, 1980 [FR] France ............................... 80 07190
Aug. 13, 1980 [FR] France ............................... 80 17894
Feb. 19, 1981 [FR] France ............................... 81 03317
[51] Int. Cl.³ .............................................. A01C 7/04
[52] U.S. Cl. ...................................... 221/265; 111/37
[58] Field of Search ............... 221/265, 278, 211, 159, 221/162, 169, 252; 111/34–36, 37, 77; 222/346, 348, 485

[56] References Cited
U.S. PATENT DOCUMENTS
658,450  9/1900  Kettler ............................ 111/37 X
2,665,005  1/1954  Mundy ............................ 221/159 X
2,777,561  1/1957  Rose ................................ 221/169 X
3,322,080  5/1967  Gatzke et al. .

FOREIGN PATENT DOCUMENTS
410691  3/1925  Fed. Rep. of Germany .
1284678  1/1961  France .
2291927  11/1975  France .

Primary Examiner—Stanley H. Tollberg
Attorney, Agent, or Firm—Young & Thompson

[57] ABSTRACT

A distribution device for a single-seed seed drill, comprises a rotatable plate 5 having a peripheral rim 6 and a substantially vertical axis of rotation. The rim 6 has recesses 9 substantially parallel to the axis of rotation and regularly spaced angularly about a circle 10 of the rim, the horizontal section of these recesses and the thickness of the rim corresponding substantially to the size of a seed. The recesses move above a fixed rim 11 in which are provided, directly below the recesses 9 of the rotatable plate, openings 13 for communication with a transport device 14 which leads to a seed drill. A barrier 22, 22' upstream of each opening 13 in the fixed plate, is provided to retain seeds not engaged in the recesses of the rotatable plate. A brake 18, 39 or 52 for the outflow of seeds is interposed between the central portion of the rotatable plate onto which the seeds are fed, and the barrier 22, 23 or 50. In this way, the undesired lodging of two seeds in a same recess is prevented, at the same time that each recess is filled with one seed. The peripheral extent of each seed feeding station can be reduced to the point that as many as twelve feeding stations can be positioned about the periphery of the device, with the result that a seed drill for seeding up to twelve furrows in the ground can be fed.

14 Claims, 22 Drawing Figures

DISTRIBUTING DEVICE FOR SO-CALLED SINGLE-SEED SEED DRILLS AND SEED DRILL COMPRISING SUCH A DEVICE

The present invention relates to so-called "single-seed" seed drills, that is to say, seed drills which permit sowing seeds and distributing them at regular intervals in the furrow opened in the soil to receive them.

The essential structure of seed drills of this type is the distribution device which, in theory, picks out seeds one-by-one from the mass of seeds and brings them individually to a transport device which carries them to the furrow.

There have previously been proposed distributors rotatable about a vertical axis comprising a rotating plate with an integral annular peripheral wall in which are provided radial holes forming chambers for the seeds. In these distributors, the seeds are thrown by centrifugal force against the peripheral wall and penetrate seed-by-seed in the recesses whose diameter and depth are only slightly greater than the diameter of a seed, the seeds being maintained in the chamber by a fixed peripheral wall which has an opening adjacent where the seed must enter the transport device. In these distributors, the centrifugal force must be high so that the seeds enter the chambers fairly rapidly and be rapidly ejected from the same. On the other hand, a high centrifugal force flattens the seeds against the peripheral wall and may cause losses. Moreover, by virtue of the high speed of rotation, the opening in the fixed wall must have a long extent to avoid shearing the seed; and the length of this opening added to the peripheral length necessary to ensure high probability of penetration of a seed into the chamber, means that one and the same distributor can feed only one or two transport devices, that is to say, distribute the seeds for one or two furrows. This type of distributor also has problems resulting from the variation in weight of the seeds on the rotatable plate.

There has also been proposed in German Pat. No. 410,691 a distributor for a seed drill comprising a plate rotatable about a vertical axis turning above a fixed plate, the rotatable plate comprising on its periphery recesses adapted each to receive one seed and the fixed plate comprising windows with which the recesses come into coincidence so that the seed located in a recess can fall into the furrow. In this device there is provided upstream of each window a wiper plate which retains the seeds that are not disposed in the recesses. But such a device gives rise to a substantial percentage of seeds being sheared between the wiper plate and the edge of the recess, or between the lower edge of the recess and the upper plane of the window; and there are substantial losses because the seeds which accumulate in front of the wiper blade form a heap in which the seeds are suspended and retained above the openings of the rotatable plate.

The present invention has for as an object to remedy these drawbacks, by providing a distributing device for single-seed seed drills of the type comprising a plate with a peripheral rim rotatable about a substantially vertical axis, having at its periphery recesses substantially parallel to the axis of rotation and regularly spaced angularly about a circle of the rim, the horizontal section of these recesses and the thickness of the rim corresponding substantially to the volume of one seed, the zone having the recesses of this peripheral rim moving above a fixed plate in which are provided, in vertical alignment with the recesses of the rotatable plate, openings for communicating with the transport device, barrier means being provided upstream of each opening of the fixed plate to retain the seeds which are not disposed in recesses in the rotatable plate, and means for braking the flow of seeds interposed between the central portion of the rotatable plate onto which are fed the seeds and the barrier means.

According to one embodiment, the peripheral rim of the rotatable plate in which are provided the recesses is separated from the central portion of the plate by a cylindrical fixed wall in which is provided, upstream of each barrier means, a window limiting the thickness and the volume of the layer of seeds on the peripheral rim that bears the recesses.

According to this embodiment, the seeds upstream of each barrier and whose volume and layer thickness are limited by the braking of the flow ensured by the window, are tumbled and roll on the surface of the peripheral rim in a fairly elongated zone upstream of the barrier; and this, in combination with a reduced speed of rotation of the plate, increases the probability of lodging of a seed in a recess, almost to 100%.

The peripheral extent of a distribution station being reduced by the fact that the holes of the movable rim may be quite close together, which permits reducing the speed of rotation for the same spacing for seeds distributed in a given time, a plurality of distribution stations may be spaced apart about the same plate, and, in practice, this number may be even as high as twelve, namely the number of rows usually sowed during a single pass.

According to another characteristic, the windows in the fixed internal peripheral wall are constituted by cut-outs of this cylindrical wall which extend to the inner wall of the latter.

In this embodiment, the seeds pass through the windows by gravity, the mass of the seeds located above the rim upstream of each barrier being limited by the fact that the seeds form a layer on the rim which counters the falling in of those which are located externally opposite the window, jamming opposite the window being avoided by rotation of the plate.

A distributor such as the above functions optimally with seeds having uniform size and shape such as unhusked beet root seeds which are in the form of regular spheres ideally adapted to the recesses of the rotatable plate, particularly when these recesses are cylindrical holes, a second seed adapted to comprise a duplicate being engaged to a height much less than its radius, which permits the barrier means to retain and to remove it from the hole in which it is located without rupturing it.

In the case of irregular seeds such as husked seeds which have a form close to that of a semi-sphere with a fairly regular base diameter and a maximum thickness of the order of the radius, two semi-spheres in base-to-base relationship can engage in the same hole without projecting above the rotatable plate, if the holes have a diameter equal to the diameter of a semi-spheroid and if the thickness of the rotatable plate is equal to this diameter. One solution would be to reduce the thickness of the plate so as to make it substantially equal to the thickness of a semi-spheroid; but, unless the random plane of the interface of the two seeds is substantially coincident with the upper surface of the rotatable plate, either twinning cannot be avoided because the plane of action of the barrier means is too high or the latter is too flexible to extract the upper duplicate from the hole, or else one of the seeds is crushed between the barrier means and the upper edge of the hole.

According to another characteristic of the invention and to overcome these difficulties, the thickness of the rotatable plate opposite the recesses is less than the maximum dimension of a seed, the fixed rim comprising a throat perpendicular to the circle on which the recesses are distributed, the section of this throat being such that a seed can only partially engage therein, the distance between the outer edge of this throat and the generatrix of the centermost recess being less than the maximum dimension of a seed but greater than its minimum dimension.

Preferably, the sum of the thickness of the plate perpendicular to the recesses and the depth of the throat is less than the sum of the greatest dimension of one seed and half its smallest dimension. By greatest and least dimensions of a seed are meant the average values for the mass of graded seeds acted on by the seed drill.

According to the above feature a seed cannot engage in the throat of the fixed plate unless its greatest dimension is substantially upright so that it can pass between the edge of the throat and the central semi-cylindrical wall of the recess facing this edge and, in this case, the seed which might form a duplicate superposed with it in the recess will, even flatwise, project above the edge of the hole more than half its thickness, which facilitates its ejection by the barrier means.

According to another characteristic aimed at facilitating the ejection of duplicates, each of the recesses of the rotatable plate has an opening toward the periphery of the rotatable plate. By opening is meant that one portion of the wall of the hole directed toward the periphery is removed or forms an inclined plane. In the first case the hole will comprise a notch opening at the periphery of the rotatable plate.

According to another characteristic the barrier means is so oriented as to displace the duplicate seeds in the direction of centrifugation, the peripheral wall surrounding the periphery of the rotatable plate being interrupted immediately upstream of the barrier means and downstream of the braking means of the outflow of the seeds to permit the rejection of the duplicate seeds, which have passed the braking means and which are arrested by the barrier means, into the hopper.

To reduce the pressure of the seeds against the barrier means that ensures the evacuation of duplicates and to reduce the flow of seeds returned to the hopper by the latter, the braking means comprises a second barrier means whose plane of action is situated at a slightly higher level than that of the first barrier means and is disposed upstream of the former. Preferably, this second barrier means displaces the seeds in a centripedal direction to return them to the central portion of the rotatable plate.

According to another characteristic and to ensure better entrainment of the seeds without risk of breakage, the vertical walls of the recesses formed in the rotatable plate are partially extended in the interior of the throat of the fixed plate. This can be done in practice by providing under the rotatable plate a concentric rib engaging in the throat having a section such as that defined above.

According to a preferred embodiment the inner surface of the peripheral rim of the rotatable plate between the circle passing through the interior generatrices of the recesses and the periphery, has a convex frustoconical shape, the recesses forming a notch opening through the periphery and the edge of the fixed plate, between the throat and the periphery, having a concave frustoconical shape conforming to the convex frustoconical shape of the lower face of the rotatable plate. In this embodiment the regions of the convex frustoconical rim of the rotatable plate between the recesses in the form of notches circulate in the throat of the fixed plate to ensure the entrainment of the selected seeds by pressing opposite their equatorial zone, which avoids all risk of breaking and the ejection of duplicate seeds is facilitated by the inclined plane which constitutes the concave frustoconical border of the fixed plate. Thus, on the one hand, the seed will be progressively brought more and more into projecting relationship proportionally as it is pushed back outwardly by the barrier means and accordingly more and more to press against this barrier means.

According to another embodiment the fixed plate has between the upstream braking means and the downstream barrier means situated upstream of the transport device, in the said zone for elimination of duplicates, a peripheral edge, beyond the outer wall of the throat, whose surface is inclined downwardly and outwardly. In this embodiment the duplicate seeds tend to fall automatically outwardly under the effect of their weight and of the centrifugal force while the seeds engaged in the throat will remain nicely retained there.

The barrier means and braking means may be constituted by a fixed wall which is rigid or flexible, a brush or a gas curtain.

However it has been determined particularly with regard to the barrier means that a flexible wall or a brush because of their deformability would not have sufficient strength to eliminate duplicates with certainty, certain duplicate seeds being able to jam mechanically in the throat and the notch, and that a curtain of gas may create in the throat a vacuum capable of projecting seeds upstream of their recess, which results in losses.

Thanks to the above characteristic according to which the surface of the peripheral edge is inclined downwardly and outwardly in the zone of elimination of duplicates, the barrier means need only eliminate an occasional rare seed and the braking means upstream of the zone of elimination of duplicates may be constituted by a neck or tunnel which lets pass a reduced but continuous flow of seeds in vertical alignment with the throat of the fixed plate. There is thus a reduction of the number lost.

According to another characteristic, the barrier means is constituted by a fixed wall having an upstream profile like the mold board of a plough, namely, an upstream surface substantially vertical opposite the internal edge of the throat and which extends, while widening and inclining rearwardly, toward the periphery. In this form the lower edge of the fixed wall can almost never come into contact with a seed and crush it and duplication is avoided due to the flexibility of the barriers constituted by brushes.

Another characteristic whose aim is substantially to simplify the form of the distributor results from the observation that the throat of the fixed plate participates in the selection of the seeds only through its external peripheral wall which maintains the seeds against being thrown outwardly while letting turn those susceptible of forming doubles. According to this characteristic, the internal peripheral wall of the throat of the fixed plate is removed and the interior wall of the notches of the rotatable plate is extended downwardly below the level of the upper edge of the external peripheral wall, preferably to adjacent the bottom of the fixed plate.

Other characteristics and advantages of the present invention will become apparent from a reading of the description of various embodiments of a seed drill according to the present invention given hereafter with reference to the accompanying drawings, in which.

Figure 1:
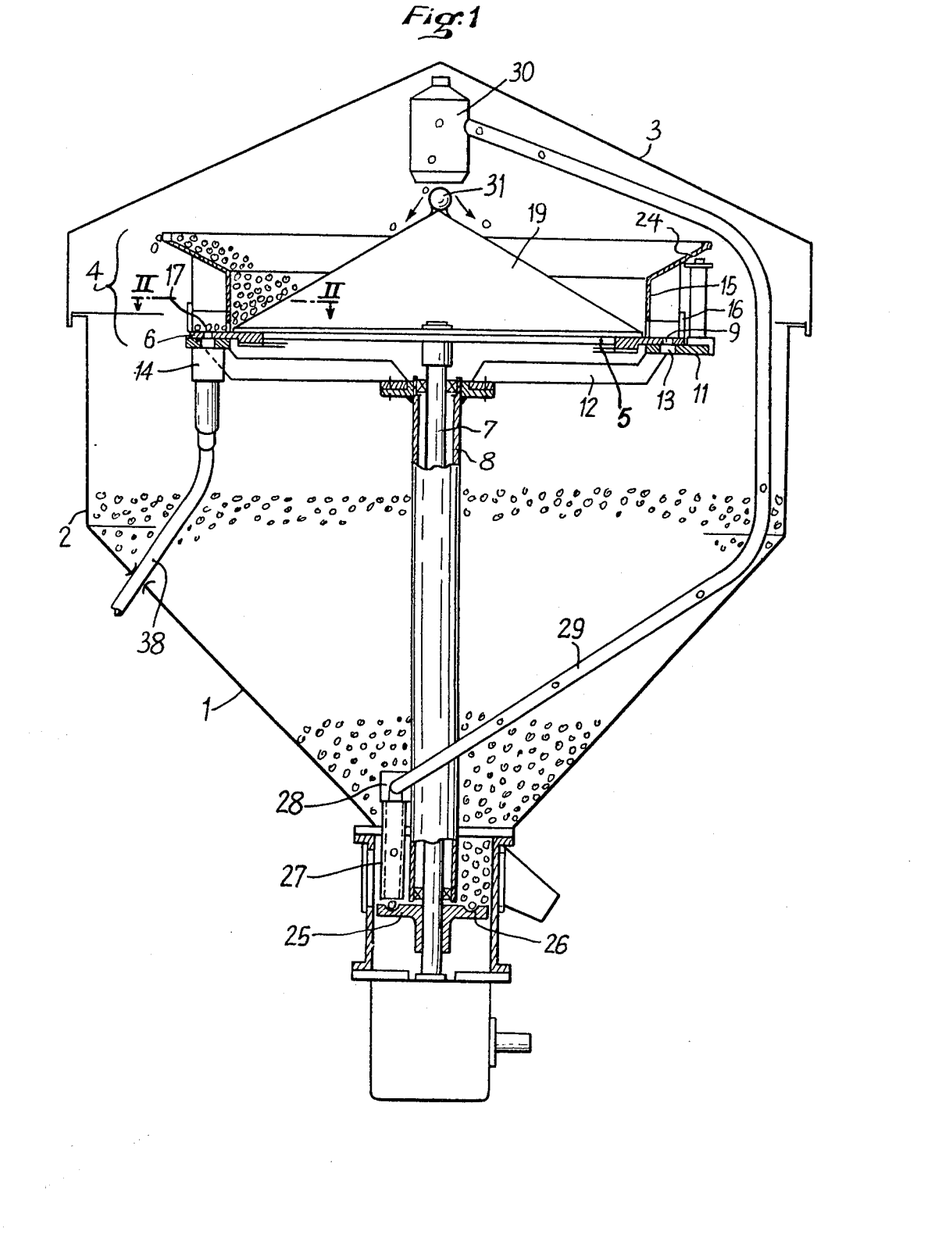
FIG. 1 is a schematic elevational side view and section of the hopper of a seed drill comprising, very schematically shown, a distributor element according to the invention.

FIG. 1 shows schematically a seed drill comprising a distributing device according to the invention and more particularly a distributing device mounted in a central hopper 1 of substantially pyramidal form and of large capacity permitting sowing simultaneously up to twelve rows of seeds of beet root, corn or the like. This hopper comprises a body 2 to receive the seeds and a cover 3 permitting refilling of the hopper. In the upper part of the hopper is disposed a distributor 4. This distributor is constituted by a rotatable plate 5 prolonged by a peripheral edge or rim 6. Plate 5 is mounted for rotation on a vertical axle 7 mounted in a vertical sleeve 8 extending through the lower end of the hopper. Axle 7 is driven in rotation by means of a transmission system of known type such as a system of gears and chain as well as a gear box from one of the driven or supporting wheels of the seed drill, such that its speed of rotation will be proportional to the speed of advance of the seed drill. The peripheral rim 6 has, in the embodiment of FIGS. 1 to 3, holes 9 with axes substantially parallel to the axis of rotation which are regularly spaced angularly about a circle 10 on rim 6. The diameter of holes 9 and the thickness of rim 6 corresponds substantially to the diameter of a seed and the rotatable plate 5 is mounted removably on the axle 7 to enable changing the rotatable plate 5 and adapting it to the seeds to be sown. The region of the peripheral rim 6 comprising holes 9 is rotatably driven above a fixed support or rim 11 which is mounted by means of support arms 12 on vertical sleeve 8. Fixed rim 11 comprises opposite the path of holes 9 of the movable rim 6, at least one opening 13 which communicates with the inlet of a transport device 14. In the illustrated embodiment twelve openings 13 are provided, regularly spaced angularly about rim 11, which permits feeding twelve transport devices 14 and as a result being able to sow up to twelve rows.

Figures 2, 3:
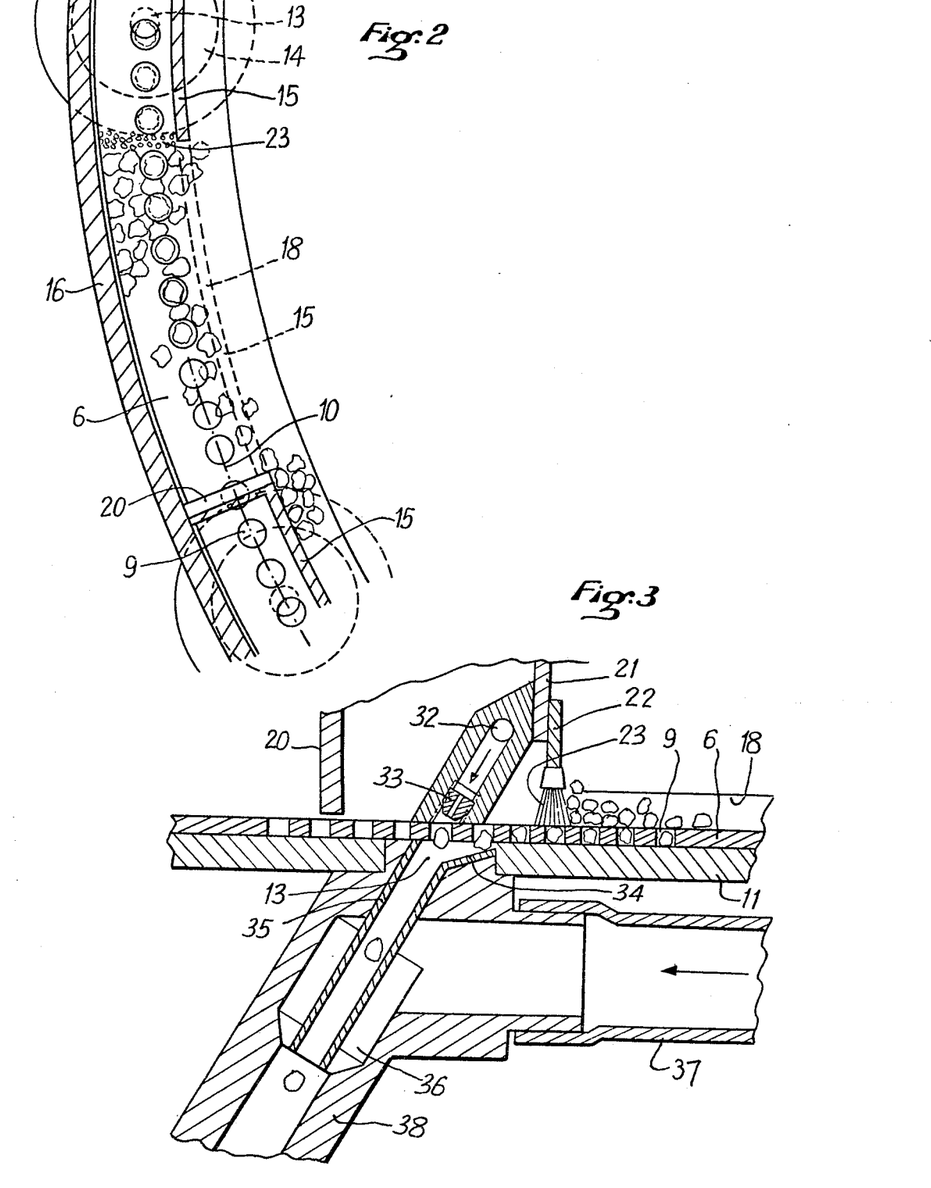
FIG. 2 is a partial cross section on the line II—II of FIG. 1, of a portion of the distributor device according to a first embodiment.
FIG. 3 is a developed vertical cross section thereof along the circle passing through the axes of the recesses of the distributor.

In the embodiment of FIGS. 2 and 3, two fixed internal and external walls 15, 16 delimit radially the rim 11 at the level of orifices 13 so as to define distribution stations 17. On the other hand, the fixed internal wall 15 comprises upstream of each distribution station 17, a window or aperture 18 formed by cutting away the lower edge of internal wall 15. It is possible to provide a non-illustrated valving device which permits partially or completely closing the window 18, and as a result either disabling the corresponding distribution station which permits regulating the number of rows to be sowed, or limiting the outflow of seeds through the window. Moreover, in the central portion of plate 5 is fixedly secured a conical element 19 which drives, by virtue of its rotation, the seeds that flow over this portion toward fixed internal wall 15 so as to cause the seeds to pass by gravity through the windows 18. The distribution station 17 which is defined by the internal and external fixed walls and by two forward and rear perpendicular walls 20, 21 comprises a plate forming a barrier 22 positioned perpendicular to the rim 6 upstream of opening 13. This plate 22 comprises in its lower portion a means eliminating duplicates, such as a bursh 23 or the like. The seeds which have passed through the window 18 accumulate against the wall forming the barrier 22 and against the brush 23. There, the seeds whose volume is limited by the fact that the outflow is retarded by the window 18, are tumbled and roll on the surface of the movable rim 6; on the other hand the speed of rotation of plate 5 bearing rim 11 is selected so as to be sufficiently slow to promote the falling of a seed into each hole 9 of the rim 6 in the zone located upstream of barrier 22-13.

In the illustrated seed drill, the seeds are supplied in excess above rotatable plate 15 and fall at the periphery of rotatable plate at 24 directly into the hopper.

In the embodiment illustrated in FIG. 1 the seeds are fed from the hopper to the rotatable plate 5 by a feed device for the seeds which is pneumatic. In the lower part of the hopper 1 is mounted on axle 7, a rotatable disc 25. This rotatable disc 25 is provided on its upper surface with a circular groove 26 having a diameter and depth substantially equal to the diameter of a seed. The disc is rotatably driven below the mass of seeds filling the bottom of the hopper 1 and the seeds are as a result fed into the groove 26. Above the groove 26 is disposed a vertical tubular element 27 into which are sucked the seeds disposed in the groove 26. The tubular vertical element 27 opens into a charging chamber 28 for the seed and the seed is propelled by air under pressure in a transfer tube 29 to a cyclone 30 positioned above the central portion of rotatable plate 5. The seeds then fall by gravity to a distributor formed by a sphere 31 positioned at the apex of conical element 19 to improve the distribution of the seeds toward the various distribution devices.

In the embodiment of FIG. 3, to improve the expulsion of the seed from the hole 9 of rim 6 into the transport device, an air delivery tube 32 comprising a nozzle 33 is mounted at each distribution station at the level of said opening 13. On the other hand, to promote the disengagement of the seed, a throat 34 of progressively increasing depth is provided in the upper face of the fixed rim 11 between a point downstream of the plate comprising barrier 22 and the opening 13 communicating with the transport device. The transport device is constituted by a tubular element 35 into which the seed is expelled by air from nozzle 33. This tubular element 35 terminates at the throat of a venturi 36 coaxial with the said tubular element, which venturi is connected to an air inlet conduit 37 and propels the seed into a conduit 38 leading to a ploughshare of the seed drill.

Figure 7:
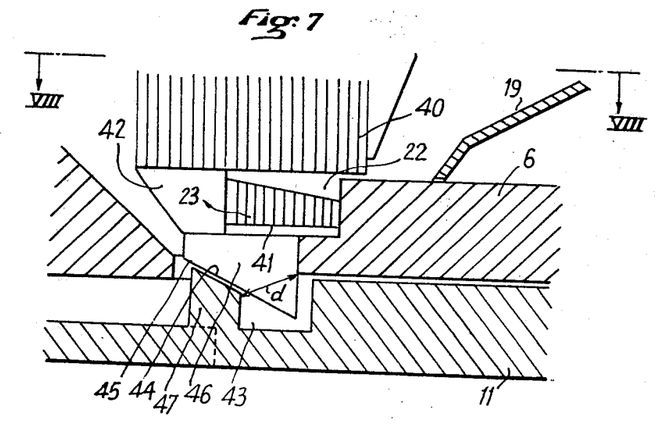
FIG. 7 is a schematic radial cross sectional view on a larger scale on the line VII—VII of FIG. 8 of another embodiment of the invention.
Figure 8:
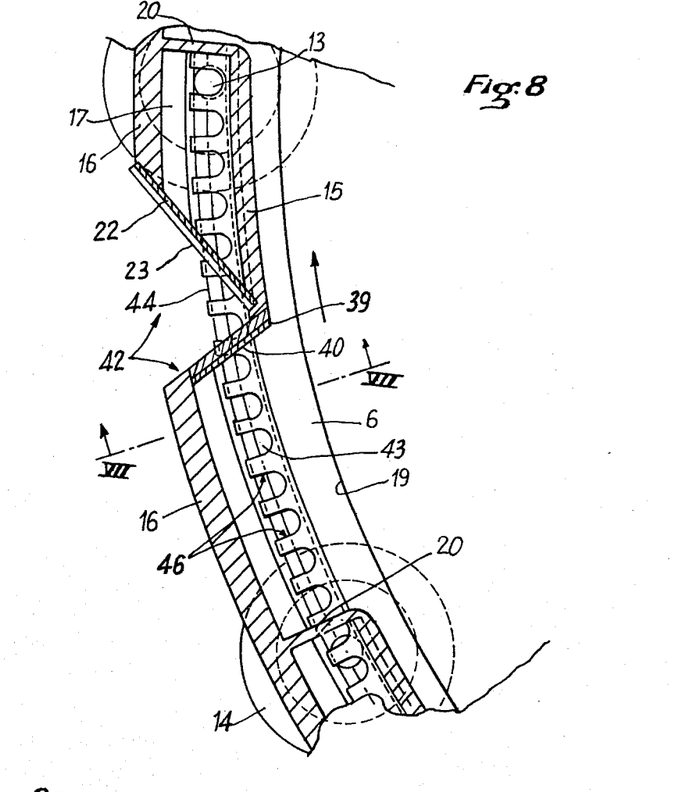
FIG. 8 is a partial plan cross sectional view on the line VIII—VIII of FIG. 7.
Figure 9A:
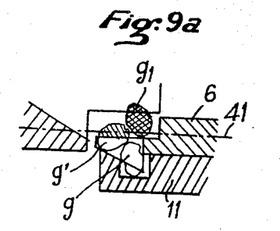
FIGS. 9a to 9f show the selection action of the distributor of FIGS. 7 and 8 for different shapes of seeds.
Figure 9B:
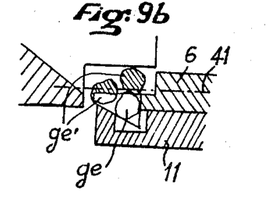
Figure 9C:
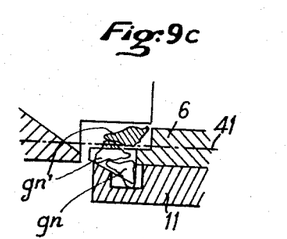
Figure 9D:
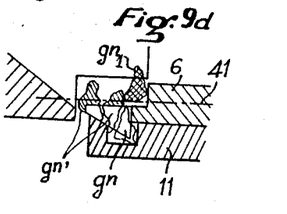
Figure 9E:
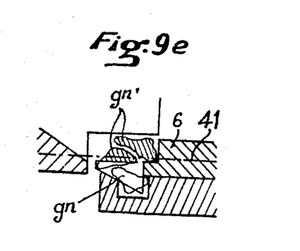
Figure 9F:
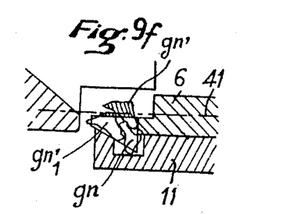

In the embodiment of FIGS. 7 and 8 and in general in FIGS. 4 to 9, the same reference numerals designate the same elements or equivalent elements.

In the embodiment of FIGS. 7 and 8 an upstream wall 39 which carries a brush 40 or the like replaces the window 18 to limit the flow of seeds which arrive at the barrier 22 for the elimination of doubles. This element 39, which is disposed above the rim 6 between the walls 15 and 16, is inclined to push the seeds in a centripetal direction and avoid accumulation of the seeds upstream of this element. Moreover a barrier constituted by a wall 22 and a brush 23 is provided downstream of this first barrier and upstream of distribution station 17, the active edge 41 of the brush being substantially at the level of the upper surface of the rim 6 and in practice being adapted to wipe against the latter. Preferably, and as shown in FIG. 8, this barrier means is disposed obliquely to throw the seeds toward the periphery of the distributor so as to cause them to fall back into the hopper through a window 42 comprised by an interruption in the peripheral external wall 16.

Figure 4:
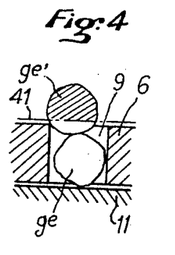
FIG. 4 shows schematically a detailed view illustrating the action of the barrier means on unhusked seeds in a distributor according to FIGS. 2 and 3.
Figure 5A:
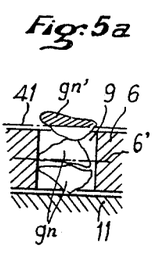
FIGS. 5a to 5c correspond to FIG. 4 in the case of husked beet root seeds.
Figure 5B:
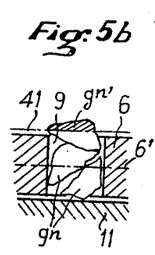
Figure 5C:
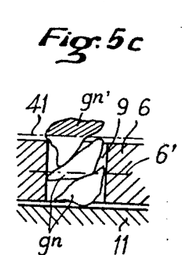
Figure 6A:
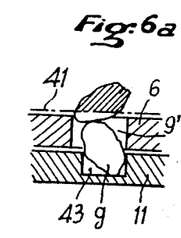
FIGS. 6a to 6d correspond to FIGS. 5 in the case of a distributor according to a second embodiment comprising round holes in the rotatable plate.
Figure 6B:
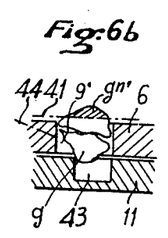
Figure 6C:
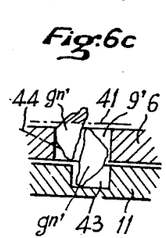
Figure 6D:
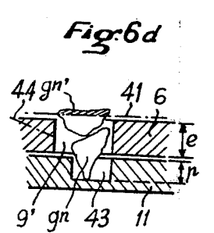

If, as shown in FIGS. 4 and 5, the holes 9 have a diameter slightly greater than the greatest dimension of the seed g, and if the rotatable plate 6 has a thickness equal to this diameter, the fixed plate being flat, an unhusked seed ge or two husked seeds gn may in practice lodge in this hole without projecting above the rotatable plate and they will escape in practice the lower edge 41 of barrier 22-23 (FIGS. 4 and 5). The superposed seeds ge' and gn' which have passed under the first braking element for the flow of seeds 39-40 will be caught by the lower edge 41 of the second barrier 22-23 but in the case illustrated in FIGS. 5b and 5c in which the large diameter base circle of the husked seeds gn' is engaged in the hole 9, there will be a risk of catching and breaking the seed gn'. It will therefore be seen that the distributor whose recesses are constituted by cylindrical holes as shown in FIGS. 2 and 3 can operated very well with unhusked seeds of suitable diameter, but that there is a high probability of doubling and risk of breakage in the case of semi-spheroidal husked seeds having a maximum dimension equal to this diameter. If, for husked seeds, the thickness of the plate is reduced as at 6' in FIGS. 5, the risk of doubling would be reduced but the lower seed gn especially when it is oriented as in FIGS. 5b and 5c, is in danger of projecting above the plate 6' and being removed from the hole, which results in a loss, or of being crushed or broken against the edge of the hole.

To overcome these difficulties and as shown in FIGS. 6, a concentric throat 43 is provided in the upper face of fixed plate 11. The section of this throat is such that a seed can only partially engage in it and the distance d (FIG. 7) between the outer edge of this throat and the radially inner generatrix of the hole 9 is less than the maximum dimension (the greatest diameter) of a seed but greater than its minimum dimension. With this form of the throat and as illustrated in FIGS. 6a, 6c and 6d, a seed can engage in the throat only with its greatest dimension oriented substantially vertically. If, moreover, the thickness of the rotatable plate 6 is such that the sum of the thickness e of the rotatable plate 6 and of the depth p of the throat is less than the sum of the greatest dimension of a seed and of half its least dimension, the second seed gn' of FIGS. 6c and 6d will bear against the upper surface of plate 11 or against the seed gn occupying the throat and will cause it to project sufficiently above the upper surface of plate 6 to be ejected by the lower edge 41 of the barrier element. The same is true for an ovoidal seed g' (FIG. 6a) or for a seed gn' (FIG. 6b) superposed on a seed gn engaged flatwise in the hole 9' of plate 6 without substantially penetrating into throat 43. This ejection will be facilitated if the hole 9' opens in the direction of the periphery of the rotatable plate or if it has a removed edge forming an inclined plane 44 in said direction.

In the embodiment shown in FIGS. 7 and 8, the peripheral portion 45 of rim 6 has a convex frustoconical shape downwardly and the holes 9' are replaced by notches 46 with cylindrical bottoms opening though the periphery of the rim, the width of these notches being, like the diameter of the hole 9, slightly greater than the greatest dimension of a seed. The peripheral wall 47 defining throat 43 has a concave frustoconical upper edge 44 to cooperate with the lower surface of the peripheral portion 45.

In this embodiment and as shown in FIGS. 9a to 9f, a single seed g, ge or gn if it be ovoidal (FIG. 9a), spheroidal (FIG. 9b) or semi-spheroidal (FIGS. 9c to 9f) may lodge in a notch 46 and eventually the throat 43 without projecting above the upper surface. As a result, the seeds which could form doubles will be ejected, the seeds $g_1$ and $gn_1$ (FIGS. 9a and 9d) by the braking element element 39, 40 and the seeds g' ge' and gn' by the edge 41 of barrier 22, 23. It is only in the very special case of a seed gn of small dimensions that a seed $gn_1'$ (FIG. 9f) is in danger of not being ejected by the edge 41 and of forming a double although it has a large chance of being moved by the seed gn' which will be thrown radially.

Figures 10, 11, 12:
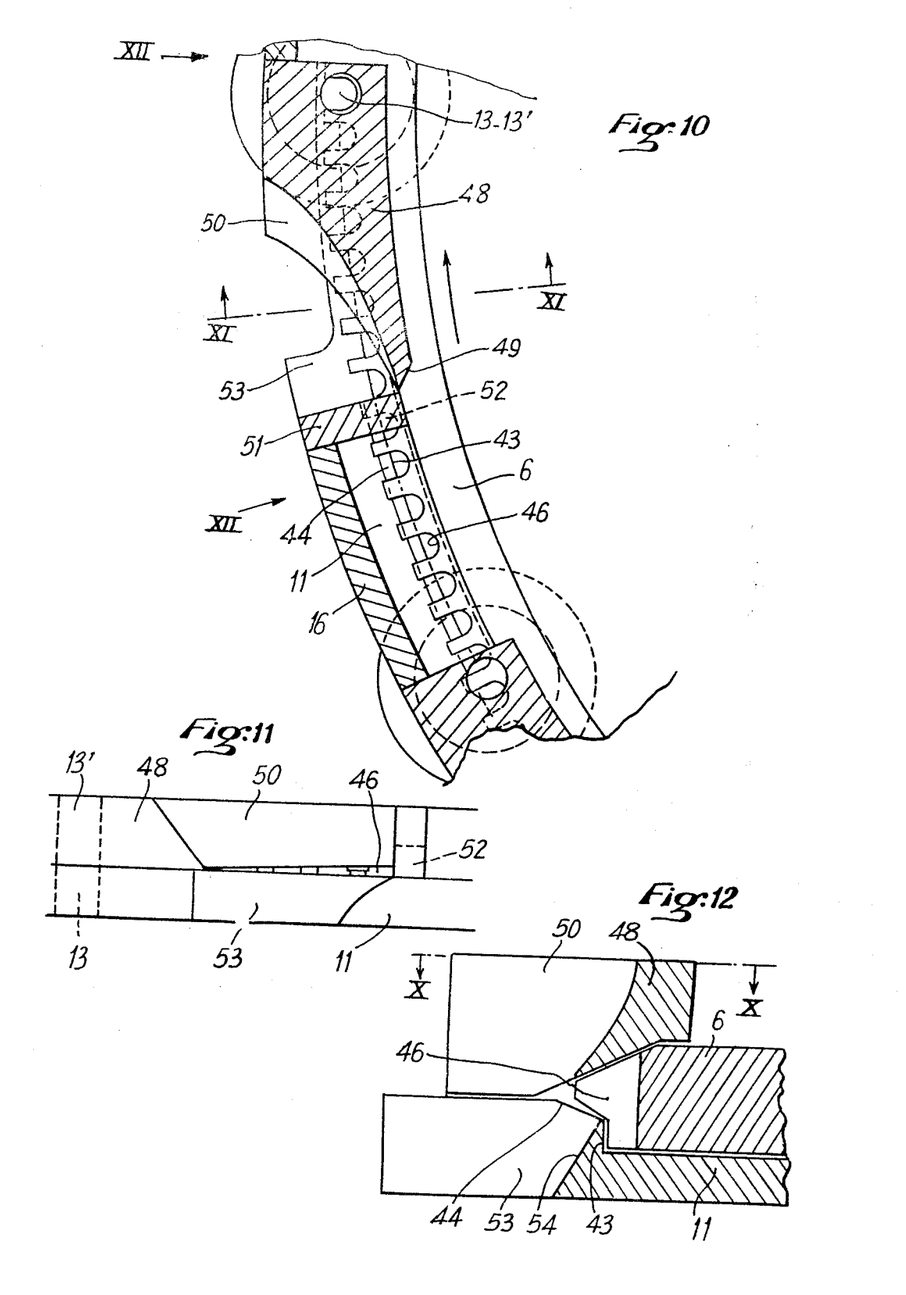
FIG. 10 is a plan view of a portion of the periphery of the distributor according to yet another embodiment, shown in section on the line X—X of FIG. 12.
FIG. 11 is a sectional view on an enlarged scale on the line XI—XI of FIG. 10.
FIG. 12 is a developed side elevational view on the line XII—XII of FIG. 10.

In the embodiment of FIGS. 10 to 12, the same reference numerals designate the same elements.

In the embodiment of FIGS. 10 to 12, the distribution station opposite which the seeds are brought to the inlet opening 13 of the transport device is constituted by a massive member 48 which defines by its internal surface the plate of the rotatable rim and in which is provided a bore 13' coinciding with opening 13 to constitute an aspiration opening of the venturi of the transport device. On the upstream side the member 48 has a cut plane 49 which returns inwardly the seeds which have not found the passage through the neck or tunnel and of which more will be said later, and a left surface which serves as an inverting plough or barrier 50 directed toward the exterior and which expels from the notches 46 the doubled seeds as will be explained hereinafter. Immediately upstream of the member 48 is mounted a radial partition 51 which extends from peripheral wall 16 to the edge of the cut-off face 49 of member 48. The adjacent lower corner of cut-off face 49 of this partition 51 is cut away, opposite the notches 46 and the throat 43, at 52 to permit the free passage of seeds. Immediately downstream of wall 51, the edge of fixed plate 11 is cut out at 53 as can easily be seen in the drawing to form an inclined plane 54 ending at the summit of the external wall 43 of the fitting of the rotatable plate 6 in the fixed plate 11. Thanks to this, the seeds which have passed through the tunnel 52 and bear against the concave frustoconical surface 41 without engaging in the space delimited by the notch 46 and the wall 43 below the upper edge of this latter, will not be supported and will fall again, the length of inclined plane 54, into the hopper which is below the distributor. If a seed which is not engaged in the above space becomes jammed by a seed engaged behind the wall 43 against the wall of the notch 46 while projecting above the upper surface of rim 6, it will come into contact with the surface 50 which causes it to tilt outwardly against the inclined plane 54. The position of these seeds being unstable, they are not in danger of being broken by the lower edge of the surface 50.

What is claimed is:

1. In a distribution device for single-seed seed drills of the type comprising a rotatable plate 5 having a peripheral edge 6, a central portion onto which are fed the seeds, and a substantially vertical axis of rotation, the peripheral edge having recesses 9 substantially parallel to the axis of rotation and regularly spaced angularly about a circle 10 of said edge, the horizontal section of these recesses and the thickness of the edge corresponding substantially to the size of a seed said peripheral edge moving above a fixed support 11 in which are provided, directly below the recesses 9 of the rotatable plate, openings 13 for communication with a transport device 14, and barrier means 22, 23, 50 upstream of each opening of the fixed support to deflect seeds not engaged in the recesses of the rotatable plate; the improvement comprising brake means 18, 39, 52 for retarding the outflow of seeds, said brake means being interposed between the central portion of the rotatable plate onto which are fed the seeds, and the barrier means 22, 23, 50.

2. A distribution device according to claim 1, in which said brake means comprises a fixed cylindrical wall 15 in which is provided, upstream of each barrier means, an aperture 18 limiting the thickness and the volume of the layer of seeds on the peripheral edge 6 carrying the recesses.

3. A distribution device according to claim 2, in which the apertures 18 in the fixed peripheral wall 15 are constituted by cut-outs in said wall 15 that extend to the lower edge of the latter.

4. A distribution device according to claim 1, in which the thickness of the rotatable plate 5 opposite the recesses is less than the maximum dimension of a seed, the fixed support 11 comprising a throat 43 in vertical alignment with the path of the recesses 9, the section of this throat being such that a seed can only partially engage therein, the distance d between the outer edge of this throat and the radially inner generatrix of the recess being less than the maximum dimension of a seed but greater than its minimum dimension.

5. A distribution device according to claim 4, in which the sum of the thickness e of said edge 6 and of the depth p of the throat 43 is less than the sum of the greatest dimension of a seed and of half its smallest dimension.

6. A distribution device according to claim 1, in which each of the recesses 9 of the rotatable plate 5 has an outlet 46 opening toward the periphery of the rotatable plate.

7. A distribution device according to claim 1, in which the barrier means 22, 23 is oriented to displace the doubled seeds in the contrifugal direction, a peripheral wall 16 surrounding the periphery of the rotatable plate being interrupted immediately upstream of the barrier means 22, 23 and downstream of the brake means 39 for the outflow of seeds to permit the falling of doubled seeds, which have passed the brake means and which are arrested by the barrier means, into a hopper.

8. A distribution device according to claim 7, in which the brake means is constituted by a second barrier means 39 whose plane of action is situated at a level slightly higher than that of the first barrier means 22 and which is disposed upstream of the first barrier means.

9. A distribution device according to claim 8, in which the second barrier means 39 displaces the seeds in a centripetal direction to return them onto the central portion of the rotatable plate.

10. A distribution device according to claim 4, in which the vertical walls of the recesses 9 provided in the rotatable plate 5 are extended partially to the interior of the throat 43 of the fixed support 11.

11. A distribution device according to claim 1, in which the lower face 45 of the peripheral edge 6 of the rotatable plate between the circle passing through the radially inner generatrices of the recesses and the periphery of the plate, has a convex fustroconical shape, the recesses forming a notch 46 opening radially outwardly through the periphery of the plate, and the edge 44 of the fixed support, between the throat 43 and the periphery, having a concave frustoconical shape complementary to the convex frustoconical shape of the lower surface of the rotatable plate.

12. A distribution device according to claim 1, in which the fixed support 11 has between the upstream brake means 52 and the downstream barrier means 50 located upstream of a transport device, in a zone of elimination of seed doubles, a peripheral edge, beyond the external wall of a throat 43, whose surface 54 is inclined downwardly outwardly.

13. A distribution device according to claim 1, in which the barrier means is constituted by a fixed wall 50 having an upstream profile in the shape of the mold board of a plough comprising a substantially vertical upstream surface which widens and inclines rearwardly, toward the periphery.

14. A distribution device according to claim 4, in which the internal peripheral wall of the throat 43 of the fixed support 11 is removed and the internal wall of notches 46 of the rotatable plate 5 extends downwardly below the level of the upper edge of said external peripheral wall, into proximity with the bottom of the fixed support 11.

* * * * *